US012585100B2

(12) United States Patent
Doblas et al.

(10) Patent No.: US 12,585,100 B2
(45) Date of Patent: Mar. 24, 2026

(54) APPARATUS AND METHOD TO CONVERT A REGULAR BRIGHT-FIELD MICROSCOPE INTO A PS-QPI SYSTEM

(71) Applicants: Ana Doblas, Cordova, TN (US); Jorge Garcia-Sucerquia, Medellin (CO); Rohan Isaac, Memphis, TN (US)

(72) Inventors: Ana Doblas, Cordova, TN (US); Jorge Garcia-Sucerquia, Medellin (CO); Rohan Isaac, Memphis, TN (US)

( * ) Notice: Subject to any disclaimer, the term of this patent is extended or adjusted under 35 U.S.C. 154(b) by 942 days.

(21) Appl. No.: 17/382,164

(22) Filed: Jul. 21, 2021

(65) Prior Publication Data

US 2022/0026697 A1 Jan. 27, 2022

Related U.S. Application Data

(60) Provisional application No. 63/054,354, filed on Jul. 21, 2020.

(51) Int. Cl.
G02B 21/14 (2006.01)
G02B 21/00 (2006.01)

(52) U.S. Cl.
CPC ......... G02B 21/14 (2013.01); G02B 21/0092 (2013.01)

(58) Field of Classification Search
None
See application file for complete search history.

(56) References Cited

U.S. PATENT DOCUMENTS

| | | | |
|---|---|---|---|
| 4,478,481 A | 10/1984 | Fusek | |
| 6,888,148 B2 | 5/2005 | Wolleschensky | |
| 6,924,893 B2 | 8/2005 | Oldenbourg | |
| 8,643,822 B2 | 2/2014 | Tan | |
| 10,261,300 B2 * | 4/2019 | Lippert | G01B 9/04 |
| 10,634,560 B2 | 4/2020 | Abdulhalim | |
| 2007/0263226 A1 * | 11/2007 | Kurtz | G01N 21/4795 |
| | | | 356/492 |

OTHER PUBLICATIONS

Singh et al (Speckle-free common path quantitative phase imaging with high temporal phase stability using a partially spatially coherent multi-spectral light source, Laser Phys.t, 16, 025601, Jan. 8, 2019, p. 1-7). (Year: 2019).*
International Search Report and Written Opinion, PCT/US21/42630, Doblas (international filing date Jul. 21, 2021).

\* cited by examiner

*Primary Examiner* — Jyotsna V Dabbi
(74) *Attorney, Agent, or Firm* — Wayne Edward Ramage; Baker Donelson

(57) ABSTRACT

An apparatus, system, and related methods for the conversion of a regular bright-field microscope into a PS-QPI (Polarization-Sensitivity and Quantitative Phase Imaging) microscope system. A regular bright-field microscope is converted by insertion of a polarizing element in the illumination path and a Fresnel biprism in the image space of the system. The converted system is suitable for real-time quantitative PS phase imaging in a broad number of biological applications aimed at understanding cell growth and dynamic changes occurring during physiological processes, as well as identification of cell/tissue screening and diagnosis.

15 Claims, 6 Drawing Sheets

MO= Microscope Objective Lens
TL = Tube lens

F= Bandpass filter
P = Polarizing Element

MO= Microscope Objective Lens
TL = Tube lens
L = Converging Lens

F = Bandpass filter
P = Polarizing Element

MO= Microscope Objective Lens
TL = Tube lens
L = Converging Lens
F= Bandpass filter
P = Polarizing Element 110
Linear Polarizer mounted
on a rotation cage mount
114
Converging lens Sensor 100

120

Eyepiece
90

82

Mirror
80

White-light Source
10

XY Stage
20

Z-axis Screw
40

50
Microscope Objective

Tube Lens (TL) 60

Filter Wheel
70

Mirror 80

External Monochromatic
Multi-Wavelength Source 150

APPARATUS AND METHOD TO CONVERT A REGULAR BRIGHT-FIELD MICROSCOPE INTO A PS-QPI SYSTEM

This application claims benefit of and priority to U.S. Provisional App. No. 63/054,354, filed Jul. 21, 2020, which is incorporated herein by specific reference in its entirety for all purposes.

FIELD OF INVENTION

This invention relates to an apparatus, system, and related methods for the conversion of a regular bright-field microscope into a PS-QPI microscope system (Polarization-Sensitivity and Quantitative Phase Imaging).

BACKGROUND OF THE INVENTION

Most unstained biological specimens have poor intrinsic contrast hampering their imaging using bright-field microscopy. However, these transparent samples induce phase shifts to the transmitted light wave. Microscopy techniques, including phase contrast, differential interference, contrast (DIC), and Hoffman modulation contrast (HMC) have been developed to translate these phase variations into intensity changes. However, these techniques do not enable accurate imaging of the 3D shape of live cells in complex 3D spatial environments. This limitation results in a significant gap in our understanding of dynamic changes occurring in the 3D cell shape and behavior of unstained specimens. Over the last decades, several quantitative phase imaging (QPI) methods have been investigated. Among all quantitative phase imaging (QPI) techniques, digital holographic microscopy (DHM) is one of the most promising to perform live-cell imaging while providing topographical information on the specimen. The five most key advantages of DHM over other QPI methods are high speed, stability, accuracy, spatial resolution, and polarization sensitivity. Temporal-phase stability is identified as one of the most important figures of merit in QPI. As any interferometric technique, all DHM systems are subject to temporal instabilities caused by vibrations and other disturbances on the systems. Among all DHM configurations, common-path DHM systems provide the highest temporal stability, allowing sub-nanometer pathlength temporal sensitivity to study dynamic events in live biological specimens. High-speed image acquisition is also critical to capture those rapid dynamic events and investigate how they are affected by external perturbations. Off-axis DHM systems are currently the fastest DHM systems since only a single recorded image is required to provide a quantitative phase image. Although all off-axis DHM systems provide rapid imaging, not all of them provide high-resolution and accurate phase images since the majority of off-axis DHM systems operate in non-telecentric mode. The reconstruction of diffraction-limited (i.e., high-resolution) DHM images can be ensured if off-axis DHM systems work at the diffraction limit. On the other hand, because several quantitative biological parameters such as the integral intracellular refractive index can be estimated from a phase measurement, a vital property of any QPI system is that its response should be accurate and shift-invariant. For this reason, telecentric-based DHM systems are the most suitable QPI systems.

Ultimately, polarization-sensitive (PS) imaging systems are advantageous in biological imaging since they enable determining the isotropic properties of different cellular and extracellular molecular components, such as microtubules and amyloid. PS systems have increased the understanding of cell biological processes, and they have been used for clinical diagnosis.

Accordingly, what is needed is a common-path polarization-sensitive (PS) DHM system and approach that addresses the above deficiencies in the prior art.

SUMMARY OF INVENTION

In various exemplary embodiments, the present invention comprises a polarization-sensitive quantitative phase imaging (PS-QPI) module that can be implemented in any commercial bright-field microscope. The present invention provides quantitative phase images and birefringence measurements with high temporal sensitivity, speed, accuracy, and spatial resolution. The QPI method of this invention employs a Fresnel biprism.

In several embodiments, the PS-QPI module provides the self-interference of the two replicas of the sample's image generated by the Fresnel biprism. The sample can be illuminated by a spatially- and temporally-coherent source. The light source employed may comprise a laser or a quasi-monochromatic light-emitting diode (LED), wherein the spatial incoherence of the light emission is broken using, for example, a spatial filter. Alternatively, the light source may be a white lamp with a narrow bandwidth filter. Additional light sources may be appropriate for use with the present illumination system in various embodiments. The PS capability is achieved by introducing a polarizing element after the illumination source so the polarization state of the illuminating beam can be changed arbitrarily. The sample is illuminated from a beam whose polarization state can be rotated. The polarization state of the illuminating beam can be as simple as a linear polarization or an elliptical polarization state.

DETAILED DESCRIPTION OF EXEMPLARY EMBODIMENTS

Figure 1:
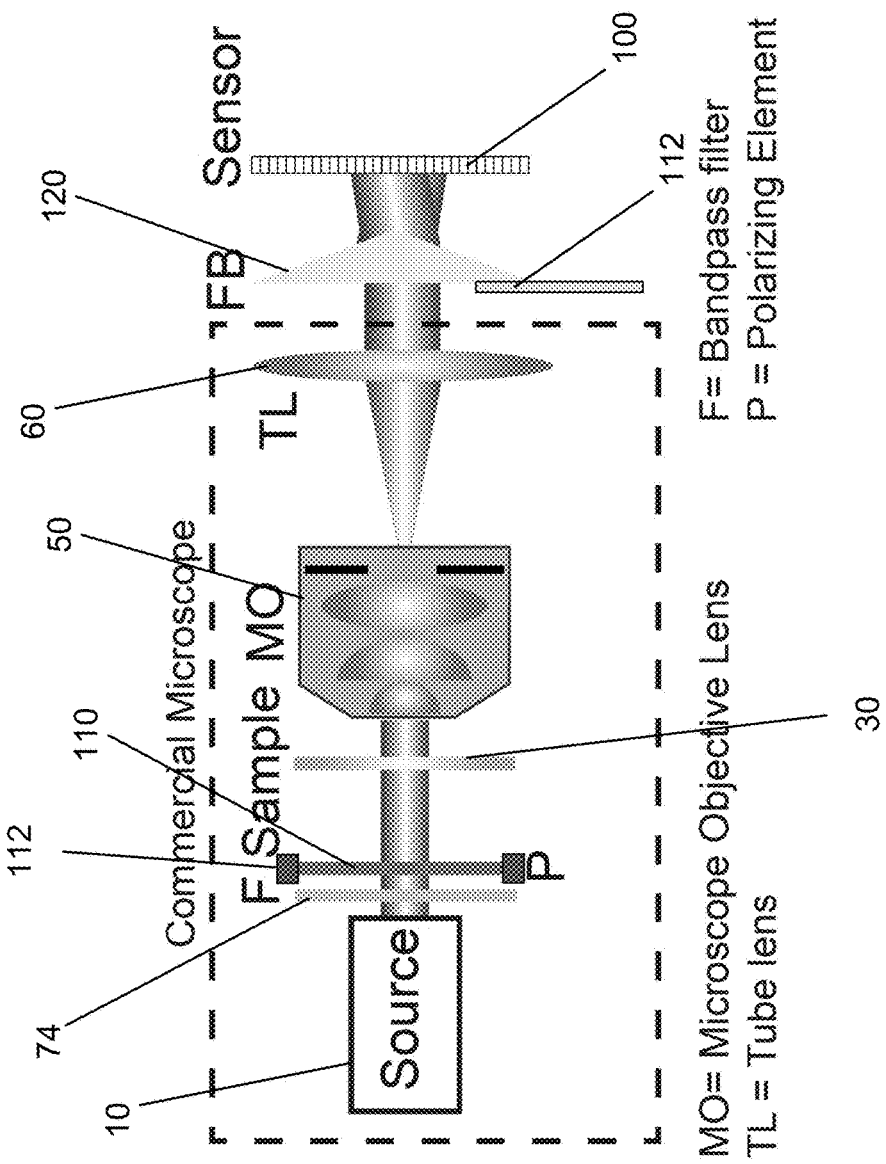
FIG. 1 shows a diagram of an exemplary embodiment of the apparatus of the present invention that can be used in conjunction with a commercial microscope suitable for sparse microscopic samples.

In various exemplary embodiments, the present invention comprises an apparatus, system, and related methods for converting a regular bright-field microscope into a Polarization Sensitive Quantitate Phase Imaging (PS-QPI) system. A bright-field microscope, also known as a compound light microscope, is an optical microscope that uses light rays to produce a dark image against a bright background, and is the standard microscope used in biological and biomedical laboratory studies. A typical bright-field microscope comprises an illumination or light source 10, a condenser that focuses a beam of light onto a specimen or sample 30, a moveable x-y stage 20 (movable by stage controls) for holding the specimen, an aperture diaphragm or contrast control that controls the diameter of the beam of light that passes through the condenser to create high or low contrast, a plurality of microscope objective lenses (MO) 50 which receive and collect the light passing through the specimen or sample 30 and form a magnified image of the specimen or sample, one or more focusing knobs or controls (e.g. Z-axis screw knob) 40 to move the stage and/or objective lenses with respect to each other, and an eyepiece 90 with two eyepiece or ocular lenses for observing the image. The image may also be directed to and captured by a sensor (such as a camera sensor) or imaging apparatus 100 (a folded mirror 82 or similar apparatus may be used to direct the image as desired). A long tube, sometimes known as the body tube, generally connects the objective lens 50 and the ocular lenses and/or sensor or imaging apparatus 100. A tube lens or lenses 60 are contained in the tube. Depending on the configuration of the system, a rotatable filter wheel 70 may be used to apply a desired filter to the light beam and image, and one or more mirrors 80 may be used to re-direct the light beam and image. Additional lenses, such as converging lenses, may be used as well.

Quantitative Phase Imaging (QPI) and Polarization-Sensitivity (PS) are two methods widely used in biological and biomedical applications. The present invention converts a regular bright-field microscope by insertion of a polarizing element 110 in the illumination path and a Fresnel biprism 120 in the image space of the system. In comparison with the prior art, the present invention achieves polarization sensitivity (PS) capability and is unique in being easily be integrated into a commercial microscope. Other advantages of the invention include, but are not limited to, high speed, accuracy, spatial resolution, and temporal stability. The above features make the present invention suitable for real-time quantitative PS phase imaging in a broad number of biological applications aimed at understanding cell growth and dynamic changes occurring during physiological processes, as well as identification of cell/tissue screening and diagnosis.

As seen in FIG. 1, the present invention comprises the precise insertion of a polarizing element 110 (which may be mounted on a rotation cage or mount 112) in the illumination path, and insertion of a Fresnel biprism (FB) 120 in the image space of the microscope imaging system. The illumination path originates with a light source 10 emitting an illumination wave passing through the sample 30 to the microscope objective lens (MO) 50. In the image space, the expanding light from the microscope objective passes through a tube lens (TL) 60, and then through the Fresnel Biprism 122 to the sensor 100. The Fresnel biprism may be on a sliding mount or slider 122, which allows the Fresnel biprism to be moved out of the light stream. In the illumination path, a bandpass filter is inserted to reduce the bandwidth of the light to make it temporally coherent. Optional optical elements may be introduced to increase the spatial coherence of the illumination beam when spatially-incoherent illumination sources such as LEDs are used.

To provide PS measurements, the imaged sample should be illuminated with polarized light whose plane-of-vibration is varied in a controlled way. A polarizing element mounted in a rotational mount is used to arbitrarily select the plane of polarization of the light incident in the sample. Alternate polarizing elements that provide polarized light whose plane of polarization can be rotated may be used.

In the image path of the microscope after the tube lens, the Fresnel Biprism is inserted to generate two polarization preserving images of the magnified image. In this embodiment, the digital hologram is directly generated by the superposition of the two images formed by the Fresnel biprism without any filtering. This embodiment has fewer elements, leading to a compact and low-cost PS-DHM module.

Figure 2:
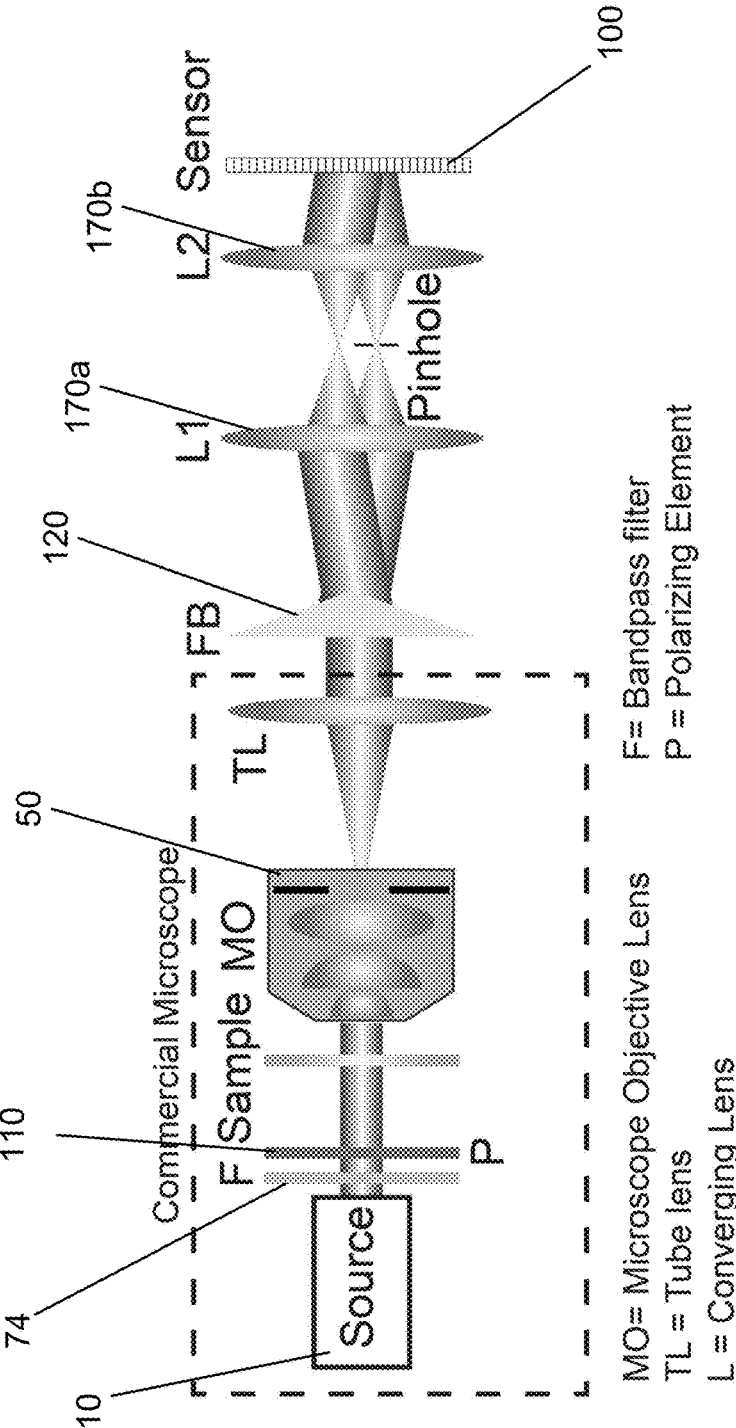
FIG. 2 shows a diagram of an exemplary embodiment of the apparatus of the present invention that can be used in conjunction with a commercial microscope suitable for dense microscopic samples.

In the illumination path of FIG. 2, a bandpass filter 74 may be inserted to reduce the bandwidth of the light to make it temporally coherent. As noted above, the digital hologram is directly generated by the superposition of the two images formed by the Fresnel biprism without any filtering. This embodiment has fewer elements, leading to a compact and low-cost PS-DHM module. This embodiment is suitable primarily for samples with sparse features as the images from both split beams interfere, and some of the sample features may overlap.

The embodiment shown in FIG. 2 is suitable for samples with denser features. In the image path of the microscope after the tube lens, a Fresnel biprism is inserted to generate two polarization preserving images of the magnified image. The afocal imaging system (comprising two converging lenses 170*a, b* with a pinhole at their common Fourier plane) is used to propagate both image beams while acting as a spatial filter for one of the image beams. This spatial filter removes the medium- and high-frequency components of one of the images, leaving only the low-frequency distribution (i.e., uniform reference plane wave). Coherent superposition of these two beams after the second converging lens 170*b* forms a digital hologram in an off-axis configuration. This hologram is recorded by the sensor as a two-dimensional image on a computer.

Figure 3:
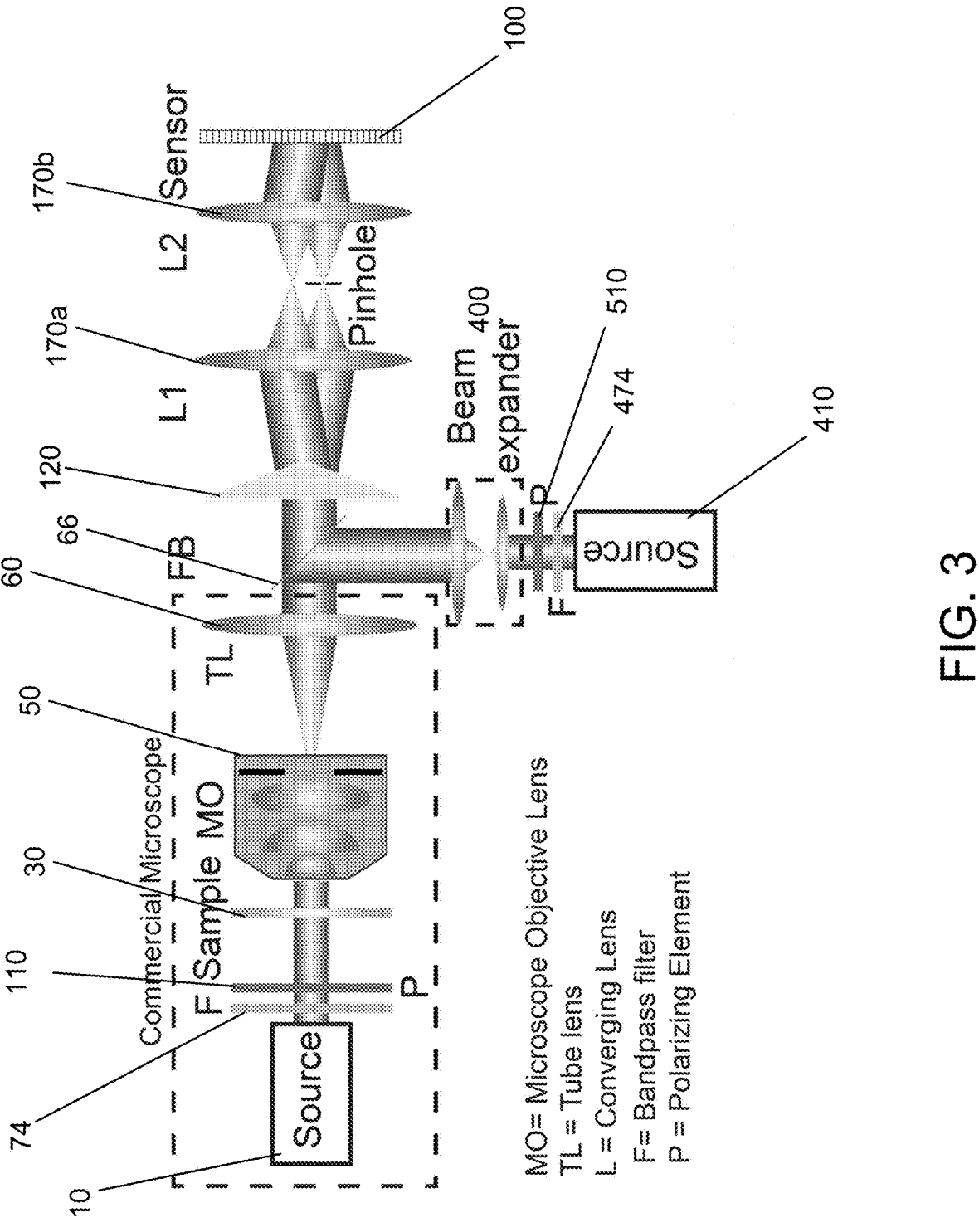
FIG. 3 shows a diagram of an exemplary embodiment of the apparatus of the present invention that can be used in conjunction with a commercial microscope suitable for transmitted and reflected illumination to provide dual-mode polarization-sensitive quantitative phase imaging.

A further exemplary embodiment, as seen in FIG. 3, is used to illuminate samples in two different modalities with either reflected or transmitted light (i.e., dual-mode PS-DHM module). The transmitted illumination (originating with source 10) operates in the same manner as described above. The reflected illumination uses the same or similar set of elements (source 410, optional bandpass filter 474, and polarizing element 510) but incident on the other side of the sample 30. The reflected illumination is inserted perpendicularly into the imaging path via a beam splitter 66 between the tube lens 60 and the Fresnel biprism 120. A beam expander 400 may be necessary to expand the reflected illumination beam in this embodiment as the illumination beam will be reduced via the microscope system comprising the microscope objective 50 and the tube lens 60. This embodiment is suitable for a broader range of materials, including optically thick samples, samples on opaque substrates, and MEMs (micro-electro-mechanical systems and devices) to detect errors in the manufacturing process.

Figure 4:
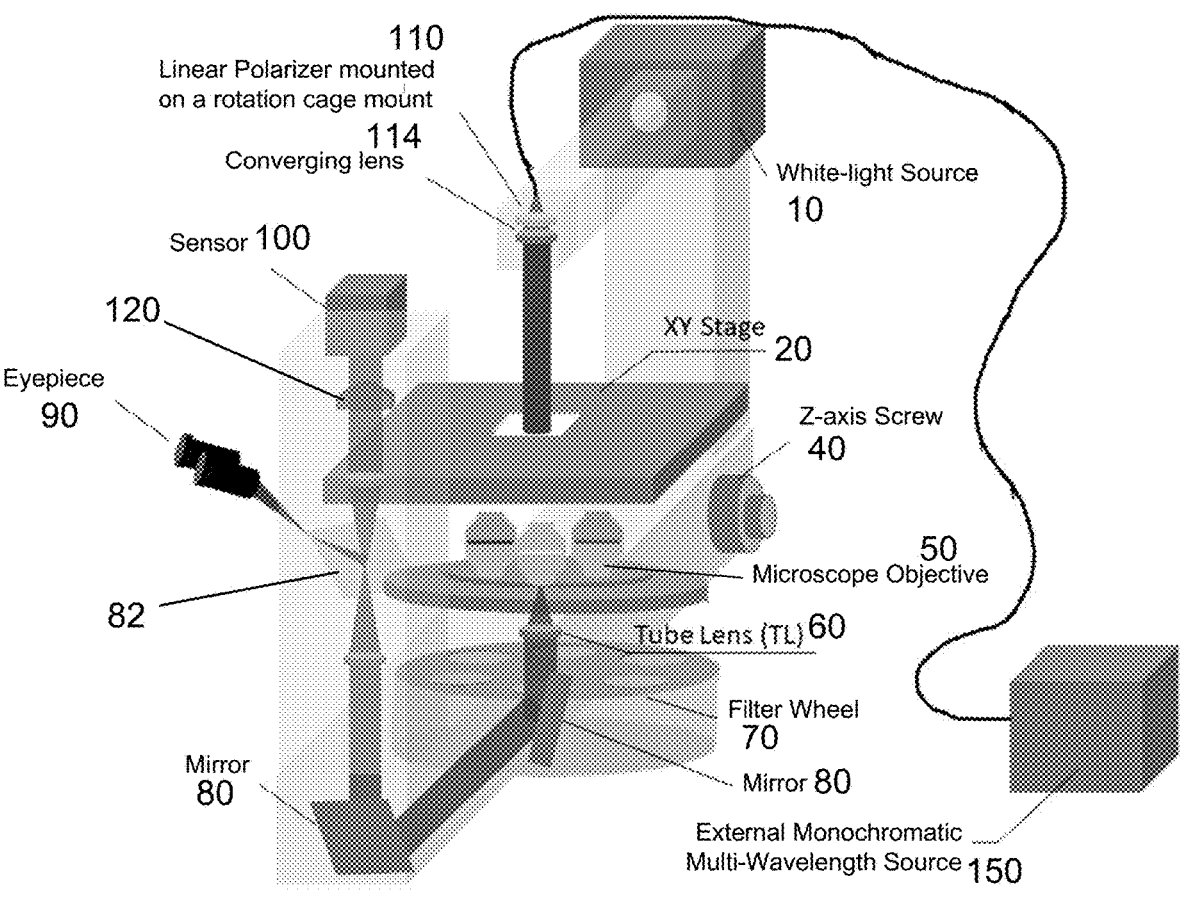
FIG. 4 shows a diagram of the apparatus of the present invention in conjunction with a conventional microscope using a monochromatic external light source.
Figure 5:
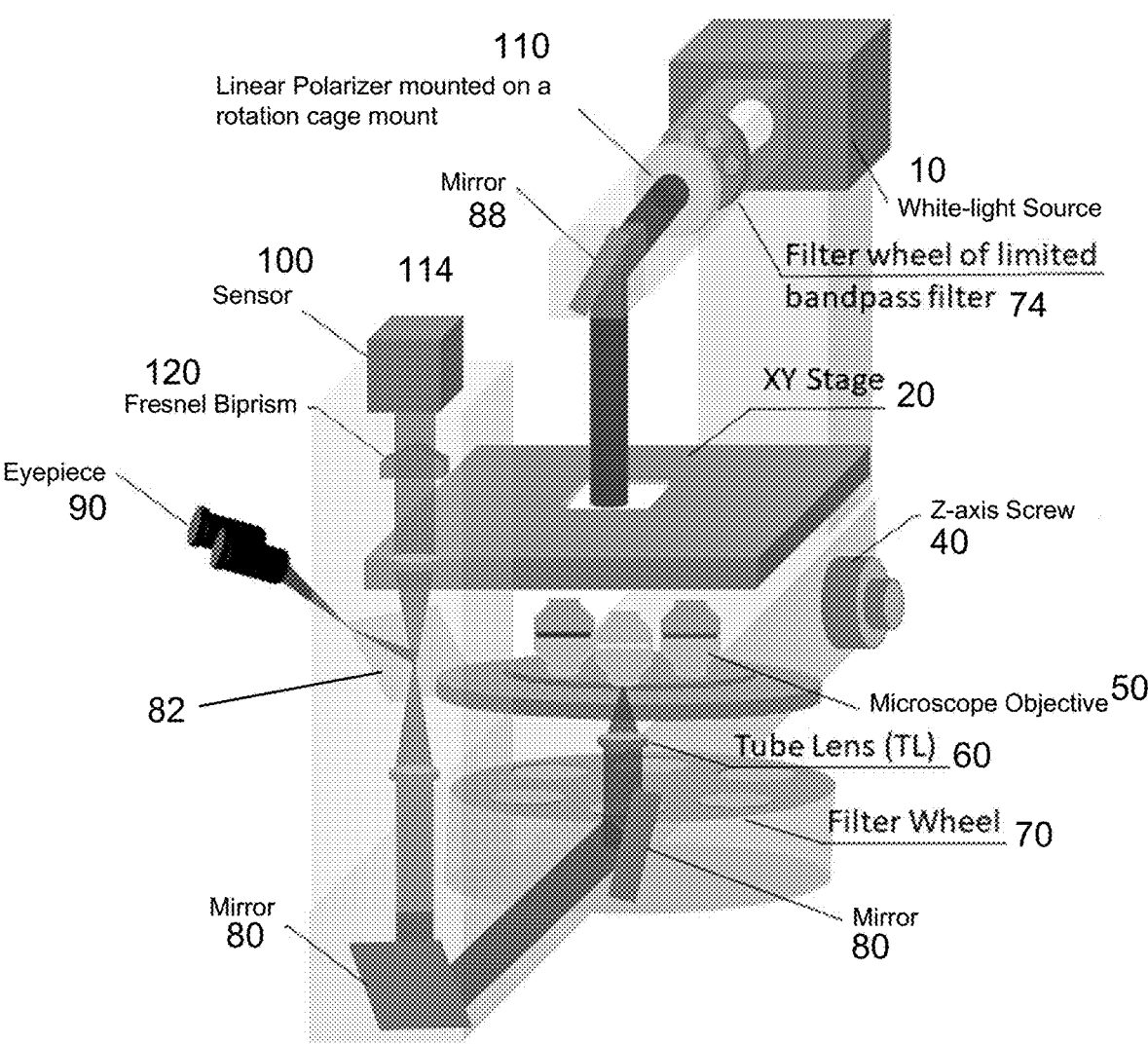
FIG. 5 shows a diagram of the apparatus of the present invention in conjunction with a conventional microscope using an integrated white-light source.

FIG. 4 shows a diagram of the apparatus of the present invention in conjunction with a conventional microscope using a monochromatic external source 150 with the polarizing element 110. FIG. 5 shows a diagram of the apparatus of the present invention in conjunction with a conventional microscope using an integrated white-light source 10. The polarized light is directed to the sample on the x-y stage 20 by a mirror 88.

The QPI capability is introduced by the use of a common-path Fresnel biprism 120 interferometer inserted in the light path after the tube lens 60. Because the image plane generated by the tube lens is inaccessible as it is located within the tube or body of the microscope, a 4f relay system is added to locate this image plane onto the camera sensor 110 and/or through the eyepiece. A 4f relay system generally comprises two lenses, a first lens and a second lens. The input plane is one focal length (f) in front of the first lens, while the output lane is located one focal length after the second lens. In between the two lenses is the Fourier plane, with the Fourier transformation of the object placed at the output plane. In several embodiments, the Fresnel biprism 120 is in inserted in the image space of the second lens of the 4f relay system (i.e., at or beyond the output plane of the second lens, between the second lens and the camera sensor 100). Since the position of the Fresnel biprism to achieve the highest FOV is independent of the objective lens used, the Fresnel biprism also may be mounted in a slider 122, which the user can manipulate to set the PS-QPI imaging capabilities "on" and "off".

In another embodiment for microscopes that have an available side port behind the tube lens, the present system may be implemented by inserting a 4f relay system attached to the side port. In this this implementation, one must ensure that the tube lens and the first lens of the 4f relay system operate in a telecentric regime. The achievement of this condition results in placing the image plane of the microscope at the back focal plane of the second lens of the 4f relay system, where an auxiliary digital imaging sensor may be inserted. Once this relay system has been established, the biprism is inserted between the second lens of the 4f and the plane of the auxiliary sensor.

The invention thus provides accurate quantitative PS phase images (PS-QPI) in a simple, compact, and cost-effective format. The low cost of this implementation (e.g., a few hundred dollars) of this architecture makes the PS-QPI technique accessible to most laboratories with standard bright-field microscopes without the cost of a standard PS-QPI system.

Figure 6:
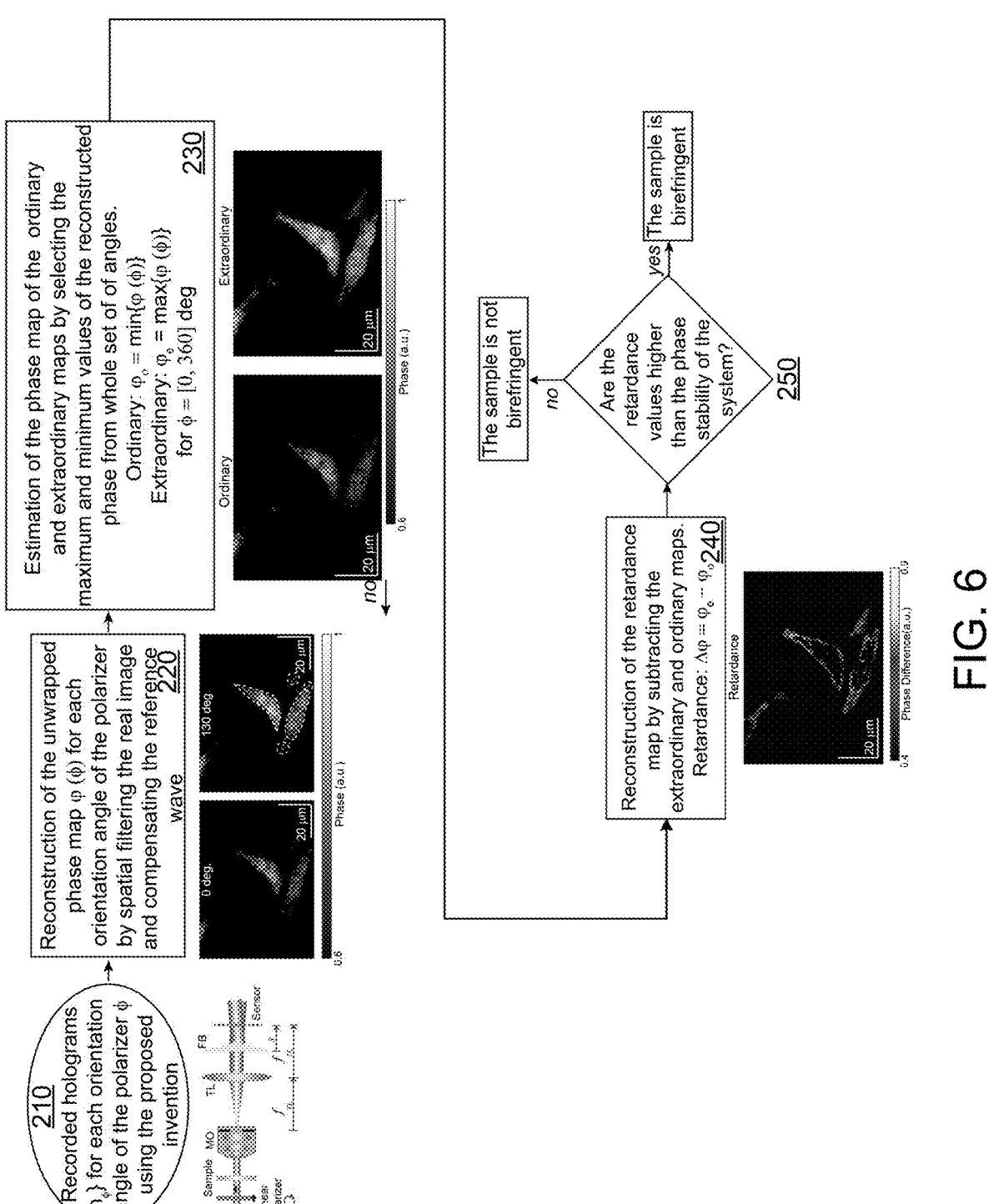
FIG. 6 shows a diagram of a method for reconstructing quantitative retardance maps in accordance with another exemplary embodiment of the present invention.

In further embodiments, the present invention uses a computer-based computational approach to reconstruct PS-DINT (polarization-sensitive digital holographic microscopy) images, as shown in FIG. 6. First, the system records the holograms 210 generated at the sensor plane for different polarization planes, namely different angles of the polarizing element. Each of these recorded holograms is then reconstructed 220. Since the present invention operates in off-axis configuration, the reconstructed phase map is retrieved by spatial filtering the spectrum of the real image from the spectrum of the hologram and compensating the reference angle introduced by the biprism. FIG. 6 shows the reconstructed 2D phase information from U87 glioblastoma cells illuminated with two different polarization planes, at 0 and 130 degrees. Some features clearly seen in the 130-deg phase map are less visible in the 0-deg phase map. A retardance map (e.g., $\Delta\phi=\phi e-\phi o$) can also be obtained. The user estimates the maximum and minimum values of the whole set reconstructed phase image at each pixel 230. Example phase maps for the extraordinary (e.g., maximum) and the ordinary (e.g., minimum) behavior are displayed. The subtraction of these unwrapped maps provides the retardance image 240. Note that in the retardance image, the contrast created is specific to the PS behavior of the sample since the cells and parts without any anisotropy are no longer visible on this image. The color scale bar in the retardance image corresponds to retardance values between 0.4 and 0.9 rad. Note that the phase sensitivity is three orders of magnitude smaller (0.0003 rad), guaranteeing that any divergence on the retardance image is because of differences on the anisotropy of the samples. If the retardance values are higher than the phase stability of the system, the sample is birefringent; otherwise, the sample is not birefringent 250.

In several embodiments, the present invention thus comprises a polarization-sensitive quantitative phase imaging system comprising of a spatially and temporally coherent illumination source, a polarizing element that can arbitrarily orient the polarization state of the source, a microscope system comprising of a microscope objective lens and tube lens that magnifies the image of the sample, a Fresnel biprism that generates two copies of the magnified image, an optional afocal imaging system comprised of two converging lenses and a pinhole located at the common Fourier plane, and a 2-dimensional detector that can record an image to a computer. The spatial and temporally coherent illumination source in the claim can be any coherent source such as diode lasers, gas lasers, discharge tubes, light-emitting diodes (LED) with limited spectral bandwidth, or wide-band light source including an incandescent, fluorescent light source with appropriate bandpass filters to limit the spectral bandwidth. The polarizing element can be any optical element or elements including one or more linear polarizers (such as, but not limited to, polaroid films, grid polarizers, and the like), waveplates (e.g., quarter-wave, half-wave, and so on), optical modulators (e.g., spatial light modulator, acoustic or electric optical modulators), or depolarizers and scramblers that may be mounted in a rotational mount to modify the polarization state of the illumination source arbitrarily. The microscope system comprises a microscope objective and a tube lens that magnifies the image of the sample that may or may not be part of an existing microscope system. The Fresnel biprism is an optical element consisting of two thin prisms joined at the base to form an isosceles prism that generates two copies of the magnified image that propagate with some angle to each other. The optical system comprises two converging lenses that can magnify the image. The pinhole is a spatial filter placed at the common Fourier plane of the optional optical system that filters the medium and high frequency content of one of the beams generated by the Fresnel biprism. The system forms a digital hologram by the coherent superposition or interference by the two copies of the images created by the Fresnel biprism. The detector is any 2-dimensional detector such as a CCD, CMOS, or other two-dimensional sensor that can record the digital hologram to a computer or a computer-readable storage device. The sample in the claim is illuminated by light from the source, filter (if necessary), and polarizing element either by light transmitting through the sample and/or from light from the source, filter (if necessary), and polarizing element reflected off the sample with the help of a beam splitter placed in the optical path between the TL lens and the Fresnel biprism. Elements of the system can be provided as external PS-QPI module that can be added to and adapted to any commercial microscope.

The apparatus of the present invention measures the polarimetric properties of microscopic birefringent samples by estimating their retardance map. A polarization-sensitive hologram is recorded by the system in a single-shot way, which is suitable for applications including live cell imaging. The computational method, as described above, comprises: the acquisition and processing of polarization-sensitive holograms by means of sequentially rotating the polarization state of the illumination in a controlled way; acquisition of polarization-sensitive holograms by rotating the polarization state of the illuminating light; computation of the phase image for each recorded hologram; and estimation of the retardance map by calculating the phase difference between the extraordinary and ordinary phases. The computation of the phase image for each hologram can be performed by digitally processing the recorded hologram using computational methods, including, but not limited to, applying fast Fourier transforms, Fourier filtering, numerical compensation approaches to eliminate the interference angle, numerical focusing algorithm(s), unwrapping phase algorithm(s), machine learning methods, and deep learning methods. The retardance map of the claim is determined and provided by subtracting the maximum and minimum values of the whole set of reconstructed phase images at each pixel. The recording process of the present invention may be optimized using machine learning and/or deep learning approaches.

The above features make the present invention suitable for real-time quantitative PS phase imaging in a broad number of biological applications. The performance of the system has been verified experimentally on both calibrated phase objects and cultured cells.

These embodiments, as well as other exemplary embodiments, as well as the tools and programs referenced above, are described in detail in the attached materials which are attached hereto and incorporated herein in their entirety (including all text and figures therein) by specific reference:

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method of measuring the polarimetric properties of birefringent samples, comprising the steps of:
    providing a polarization-sensitive quantitative phase imaging (PS-QPI) system comprising
        a microscope comprising an illumination source, a microscope objective lens and a tube lens, configured to magnify an image of a sample;
        a polarizing element configured to orient a polarization state of the illumination source;

a Fresnel biprism; and
        a sensor or detector;
    sequentially rotating the polarizing element in a controlled way to change the illumination polarization state;
    generating and recording holograms for each orientation angle of the polarizing element;
    reconstructing an unwrapped phase map for each orientation angle;
    selecting maximum and minimum values of the reconstructed phase map to generate an ordinary phase map and an extraordinary phase map for each orientation angle; and
    calculating phase difference between the extraordinary phase map and the ordinary phase map to generate a retardance map.

2. The method of claim 1, wherein the sensor or detector is a two-dimensional detector configured to record an image to a computer.

3. The method of claim 1, wherein the sensor or detector is a CCD or CMOS configured to record an image to a computer.

4. The method of claim 1, wherein the illumination source is spatially and temporally coherent.

5. The method of claim 1, wherein the illumination source comprises a diode laser, gas laser, discharge tube, light-emitting diode with limited spectral bandwidth, a wide-band light source, or an incandescent and/or fluorescent light source with bandpass filters configured to limit spectral bandwidth.

6. The method of claim 1, wherein the polarizing element comprises a linear polarizer or a waveplate.

7. The method of claim 1, wherein the polarizing element is mounted in a rotational cage or mount.

8. The method of claim 1, wherein the microscope is a commercial bright-field microscope.

9. The method system of claim 1, wherein the Fresnel biprism is configured to generate two copies of the magnified image of the sample with some angle to each other.

10. The method of claim 9, wherein the Fresnel biprism comprises two prisms joined at respective bases.

11. The method of claim 9, wherein the system forms a digital hologram by coherent superposition or interference of the two copies of the magnified image.

12. The method of claim 1, further comprising an afocal imaging component comprising a first converging lens and a second converging lens with a common Fourier plane therebetween, and a pinhole located at the common Fourier plane.

13. The method of claim 12, wherein the afocal imaging component magnifies the image of the sample.

14. The method of claim 12, where the pinhole comprises a spatial filter configured to filter medium and high frequency content of one of a pair of images generated by the Fresnel biprism.

15. The method of claim 1, further comprising:
    a secondary polarization module comprising a second illumination source and a second polarizing element, wherein the secondary polarization module introduces a reflected image of the sample into an optical path; and
    a beam splitter placed between the tube lens and the Fresnel biprism.

* * * * *